Jan. 10, 1961 W. H. DU SHANE ET AL 2,967,575
TRACTOR-IMPLEMENT POWER CONTROL SYSTEM
Filed Aug. 2, 1956 3 Sheets-Sheet 1
FIG. 1
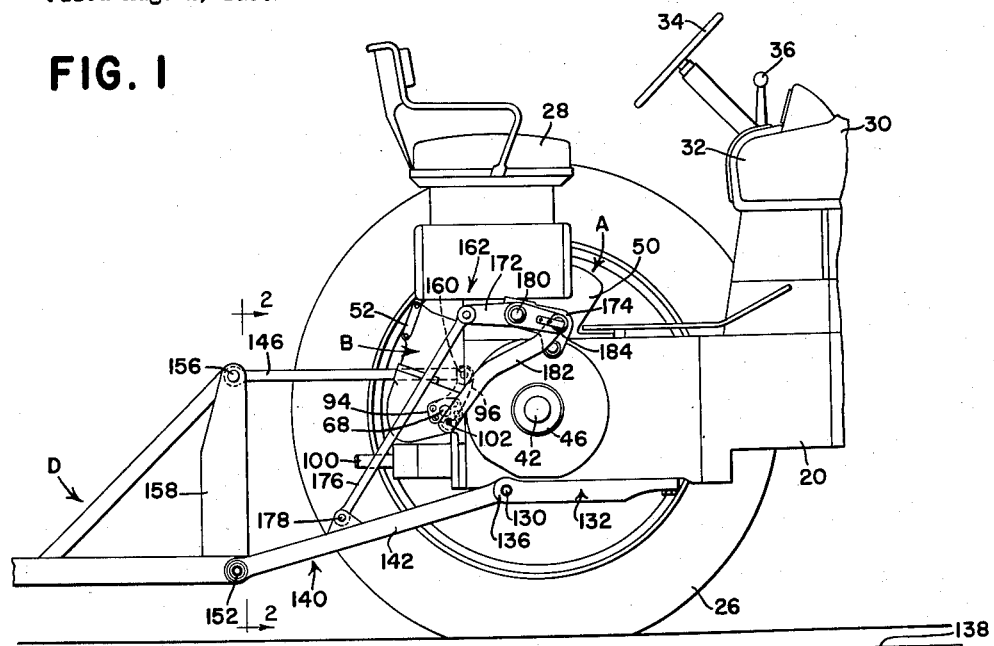
FIG. 2
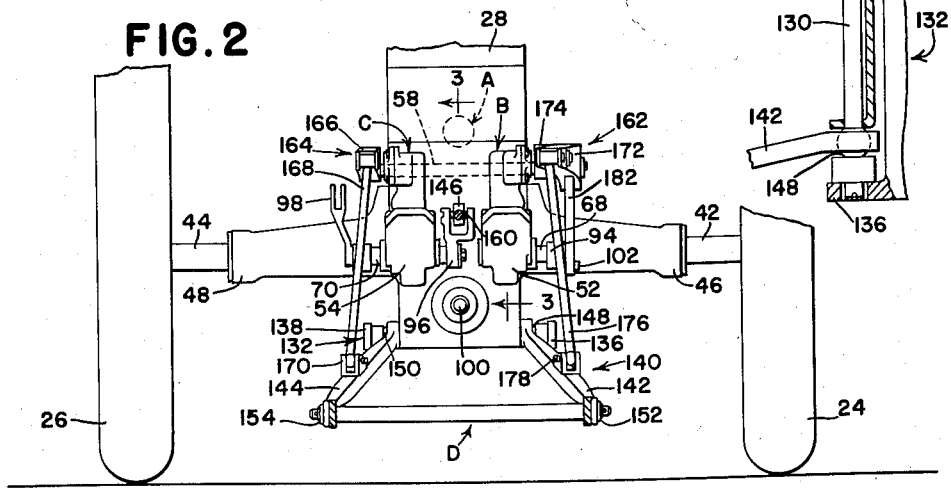
FIG. 11
INVENTORS
W. H. DuSHANE
E. H. FLETCHER Jan. 10, 1961 W. H. DU SHANE ET AL 2,967,575
TRACTOR-IMPLEMENT POWER CONTROL SYSTEM
Filed Aug. 2, 1956 3 Sheets-Sheet 2
FIG. 3
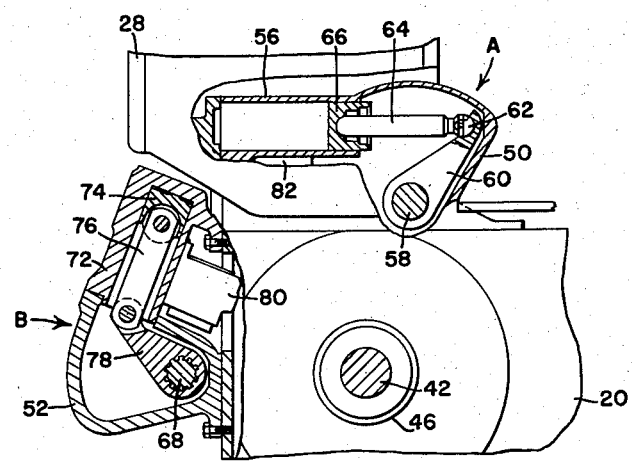
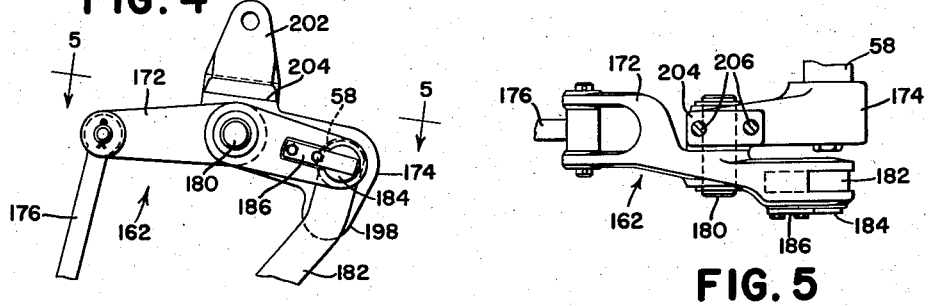
FIG. 4
FIG. 5
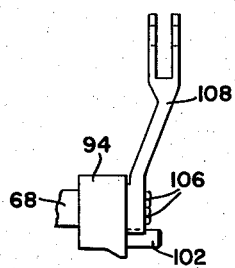
FIG. 6
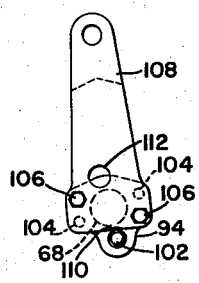
FIG. 7
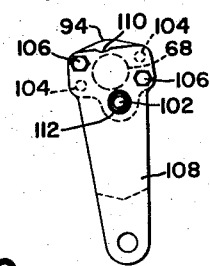
FIG. 8
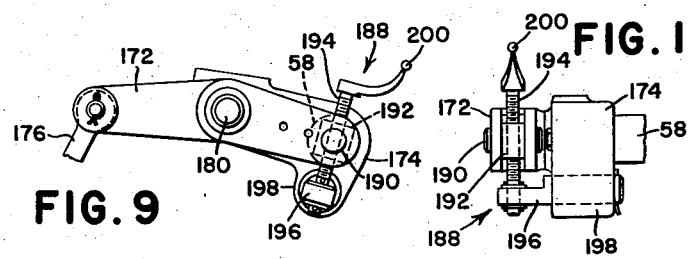
FIG. 9
FIG. 10
*INVENTORS*
W. H. DuSHANE
E. H. FLETCHER Jan. 10, 1961    W. H. DU SHANE ET AL    2,967,575
TRACTOR-IMPLEMENT POWER CONTROL SYSTEM
Filed Aug. 2, 1956    3 Sheets-Sheet 3

*INVENTORS*
W. H. DuSHANE
E. H. FLETCHER

United States Patent Office 2,967,575
Patented Jan. 10, 1961

2,967,575

TRACTOR-IMPLEMENT POWER CONTROL SYSTEM

Wallace H. Du Shane, Waterloo, and Edward H. Fletcher, Cedar Falls, Iowa, assignors, by mesne assignments, to Deere & Company, a corporation of Delaware Filed Aug. 2, 1956, Ser. No. 601,742

17 Claims. (Cl. 172—446)

This invention relates to a power control system especially adapted for agricultural tractors and associated implements. More particularly, the control system involves a multi-function system including a plurality of hydraulic cylinders integrally mounted on the tractor and individually associated with a plurality of rockshafts by means of which force may be transmitted to a variety of implements or a variety of implement parts mounted on, drawn by or otherwise propelled by or used with the tractor.

It has long been known to utilize in a tractor a transverse rockshaft powered by an integral or built-in hydraulic system, one or both ends of the rockshaft being equipped with force-transmitting arms for raising and lowering or otherwise adjusting an associated implement. According to the present invention, this well-known principle is improved and elaborated to include a plurality of rockshafts and associated built-in cylinders, thereby affording a control system having wide flexibility. An important object of the invention is to utilize the multi-function system with drawn implements, particularly those connected to the tractor by the so-called three-point hitch. There is thus available for the implement one power unit for bodily raising and lowering the implement, another power unit for leveling the implement fore-and-aft, and a third power unit for leveling or adjusting the implement laterally about a generally fore-and-aft axis. In this phase of the invention, it is a significant object to utilize one of the rockshafts for transmitting force through the top link of the three-link draft linkage. In that phase of the invention involving lateral leveling or tilting of the implement, it is an important object to utilize an adjustable link connection between the draft linkage and the main rockshaft and to accomplish adjustment by a power unit involving one of the auxiliary rockshafts.

In its over-all aspects, when concerned with the control of implements other than those connected to the tractor by the three-point hitch linkage, the invention features the availability of the several rockshafts for adjusting implements that are mounted on the tractor at the front or sides thereof or otherwise, a particular example being the well-known multi-row cultivator including front and rear cultivator rigs. It is a specific object of the invention to provide the rockshafts with a plurality of different types of control arms, some of which are selectively positionable on the respective rockshafts so as to make available force-transmitting connections at different vertical levels. It is also an object of the invention to provide the control system as a built-in system including power cylinder housings appropriately associated with the tractor so that the tractor may be optionally equipped with one or more of the several units. It is significant that this arrangement is accomplished without materially enlarging the rear portion of the tractor, which is not to say that the units could not be otherwise mounted.

The foregoing and other important objects and desirable features inherent in and encompassed by the invention will become apparent as preferred embodiments thereof are disclosed in detail in the ensuing specification and accompanying drawings, the several figures of which are described immediately below.

Fig. 1 is a side elevational view of the rear portion of the tractor and a forward portion of a drawn implement, the near wheel of the tractor being removed to expose the over-all power control system.

Fig. 2 is a rear elevation of the structure shown in Fig. 1, the view being partly in section as seen generally along the line 2—2 of Fig. 1.

Fig. 3 is an enlarged longitudinal section as seen substantially along the line 3—3 of Fig. 2.

Fig. 4 is an enlarged detail view of part of the means for adjusting one of the lift connections.

Fig. 5 is a plan view of the structure shown in Fig. 4, partly in section as seen along the line 5—5 of Fig. 4.

Fig. 6 is a rear view showing the mounting of a power control arm on one end of one of the auxiliary rockshafts.

Fig. 7 is an end view of the same.

Fig. 8 is a similar end view, but with the arm reversed or re-positioned.

Fig. 9 is a view of a structure similar to Fig. 4 but showing a manual adjustment of one of the lift links.

Fig. 10 is an end view of the structure of Fig. 9.

Fig. 11 is an enlarged fragmentary view, partly in section, illustrating one of the pivotal connections of a draft link to the tractor.

Figure 13:
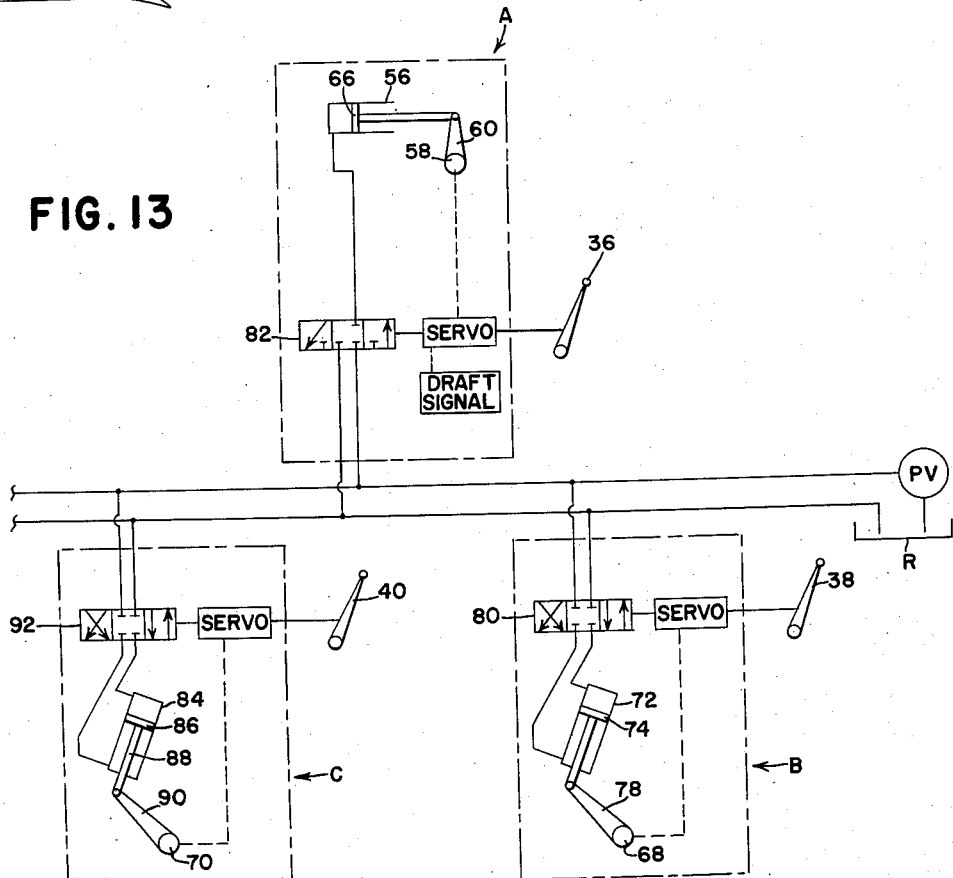
Fig. 13 is a schematic diagram of the hydraulic circuits for the power control system.

The tractor has in general an outward appearance typical of many agricultural tractors and to this extent includes a longitudinal or fore-and-aft body 20 carried at its front end on front wheel means 22 and at its rear end on right and left hand rear wheels 24 and 26. The body supports a rearwardly positioned operator's seat 28 and a forwardly located engine hood and radiator grille structure 30, at the rear end of which is a control panel 32 including a steering wheel 34 and control lever means for the power control system. First, second and third manual control levers 36, 38 and 40, respectively, appear in Fig. 13. Only the right hand one of these three levers appears at 36 in Fig. 1.

The right and left hand rear wheels 24 and 26 are keyed to right and left hand axles 42 and 44 which are in turn appropriately supported in right and left hand axle housings 46 and 48, respectively.

The improved power control system comprises first, second and third power units or power-operated devices A, B and C, respectively, each of which is powered in the first instance from the tractor engine by means of a hydraulic control system including a suitable source of fluid pressure, here a variable displacement pump PV and a reservoir R. Since the power units A, B and C are of the so-called integral or built-in types, they are integrated with the tractor body, being preferably in the form of separate unit castings 50, 52 and 54. The unit A is preferably centrally located as respects the width of the tractor and is positioned beneath the operator's seat 28. This unit comprises a hydraulic cylinder 56 of the fully enclosed type and part of the casting serves as a bearing for a first transverse rockshaft 58. An internal arm 60 is keyed to the rockshaft and is pivotally connected at 62 by an internal piston rod 64 to a piston 66 in the cylinder 56. The cylinder-piston assembly 56—66 or fluid motor is of the one-way type, and is arranged so that extension of the motor (Fig. 3) rocks the rockshaft 58 in a clockwise direction under fluid pressure supplied by the pump PV. Reverse rocking of the rockshaft 58 will occur because of an implement or other load applied thereto, as will be apparent later.

The castings 52 and 54 for the units B and C are disposed in side-by-side relationship at the rear end of the body 20 and are laterally spaced apart to afford an intervening space, for reasons to become presently apparent. Each of these castings is rigidly secured to the rear wall of the body, as best shown in Fig. 3, and are removable or replaceable at will so that either or both can be omitted or added as desired.

The unit B has a short transverse rockshaft 68, and the unit C has a short coaxial rockshaft 70. These rockshafts, when considered with the first rockshaft 58, become second and third rockshafts. Each of the second and third rockshafts is appropriately journaled in its casting 52 or 54, respectively.

The casting 52 includes a cylinder 72 containing a piston 74 which is connected by a piston rod 76 to an internal arm 78 which is in turn keyed to the rockshaft 68. The fluid motor thus afforded by the cylinder-piston assembly 72—74 is of the fully enclosed type and moreover is bi-directional. A valve housing 80 is internally attached to the cylinder 72 and is representative of any one of a number of types of valves that could be used. The details of the valves are not important. Part of a valve housing appears at 82 for the unit A.

The structural relationship of the units B and C relative to each other and to the tractor and unit A will be generally clear from Fig. 2. The units B and C are substantially identical, with differences to be pointed out below. The internal characteristics of the unit C will be clear from Fig. 13, wherein it will be seen that this unit includes a cylinder 84, a piston 86, a piston rod 88 and an internal arm 90 connecting the piston rod 88 to the rockshaft 70. The valves 80 and 82 are illustrated schematically in Fig. 13, along with a valve 92 for the unit C. These valves are shown schematically connected to the respective control levers 36 for the valve 82, 38 for the valve 80 and 40 for the valve 92. The arrangement is preferably such that the unit A combines coordinated draft and position or load and depth control, a typical example of which forms the subject matter of the U.S. patent to Edman 2,721,508. Accordingly, the rectangle labeled "Servo" and the additional rectangle labeled "Draft Signal" are representative of such coordinated load and positioned signals. In general, this arrangement is deemed to be sufficiently well-known as to require no detailed discussion. As for the units B and C, it is normally satisfactory that these include only position control and therefore each portion of the circuit involved with the respective unit includes appropriate follow-up means, here represented as a rectangle bearing the legend "Servo." The mechanical interconnections between the control levers 36, 38 and 40, the valves 82, 80 and 92 and the servos and draft signal are illustrated only schematically. For the present disclosure, as has already been stated, these details are not material, it being sufficient to note only that the three units are compactly arranged at the rear of the tractor without materially enlarging the tractor and without adversely affecting its silhouette.

As best seen in Fig. 2, the unit B is at the right hand side of the longitudinal median plane of the tractor, and the unit C is at the left hand side of that plane. In this respect, the expressions "right" and "left" are used with reference to the position of an observer standing behind the tractor and looking forwardly.

The rockshaft 68 projects at its right hand or outer end from the housing or casting 52 of the unit B and has rigidly secured thereto a short crank arm 94; although, other types of arms are variously mountable on this rockshaft. The unit C differs from the unit B in the respect that the rockshaft 70 projects at its opposite or inner or outer ends from the housing or casting 54, having at its inner end a central arm 96, affixed thereto, and having at its outer or left hand end a force-transmitting arm 98. The central arm 96 is accommodated in the space between the two castings 52 and 54 and lies just above the tractor power take-off shaft, which is indicated generally at 100. As will appear below, the three rockshafts 58, 68 and 70, together with a variety of arms that may be attached thereto in various positions, are useful as power-operated devices for controlling different types of implements used with the tractor or various parts of a single implement, as the case may be.

As best shown in Figs. 2 and 6 through 8, the right hand crank arm 94 (on the end of the rockshaft 68) has an integral crank pin 102, the purpose of which will presently appear. The outer face of the crank arm 94 has therein a plurality of tapped bores, such as 104, which receive removable securing means in the form of a plurality of cap screws 106 for effecting the rigid mounting on the crank 94 of a force-transmitting arm 108. This arm may be mounted on the crank in either of two positions, represented by Figs. 7 and 8. In that position in which the arm 108 extends upwardly from the rockshaft 68 (Fig. 7), the rockshaft-proximate portion of the arm has a notch 110 which cooperates with the crank pin to effect a torque-transmitting connection. In the depending position of the arm 108 (Fig. 8), the crank pin 102 receives an aperture 112 in the arm. Thus, when the arm 108 occupies its Fig. 7 position, it is symmetrical as respects the arm 98 on the left hand end of the rockshaft 70, and the free ends of these arms rise to a level above that of the axle housings 46 and 48, respectively. In a case of this type, as exemplified in Fig. 12, the arms may be utilized to raise and lower front cultivator rigs, the right hand one of which is shown at 114 as being supported on a typical transverse pipe 116 at the front of the tractor and having a lift arm 118 connected to the rockshaft arm 108 by a conventional push rod or link 120. The link 120 is typically connected at 122 to the cultivator rig 114. It will be understood that there is a similar rig at the opposite side of the tractor powered from the other rockshaft arm 98. If the cultivator includes a rear rig, such as that shown at 124 in Fig. 12, it will be be controlled as to vertical adjustment from the rockshaft 58, in which case each end of the rockshaft will have affixed thereto a lift arm 126 which will be connected to the cultivator rig 124 by a lift link 128. The forward end of the rig 124 is pivotally connected to the rear end of the tractor by a transverse pivot bar 130 and associated supporting structure 132, the details of which will be clarified below. Since the several rockshafts 58, 68 and 70 are individually controllable, which will be apparent from Fig. 13, desirable flexibility in the raising and lowering of the cultivator rigs is available, such as is required in point-row cultivation, for example. The arrangement will suggest the applicability of the control system to a variety of other uses, which need not be elaborated here.

The association between the transverse pivot bar 130 and the supporting structure 132 will be clear from Figs. 1 and 11. The structure 132 is secured to a bottom rear portion of the tractor body 20 and cooperates with a depending part of the tractor body, as at 134, to support the bar at its opposite ends between right and left hand ears 136 and 138. In addition to serving as means for mounting the rear cultivator rig 124, for example, the pivot bar 130, which is normally held against rotation relative to the structure 132, provides means for connecting draft linkage 140 to the tractor and the bar is subjected to bending by implement loads imposed through the draft linkage and thereby produces the signal for the draft or load control referred to above. This aspect of the arrangement forms the subject matter of copending application Ser. No. 513,352, filed June 6, 1955, refiled April 16, 1958 as Ser. No. 730,743, now Patent No. 2,940,530.

Figure 12:
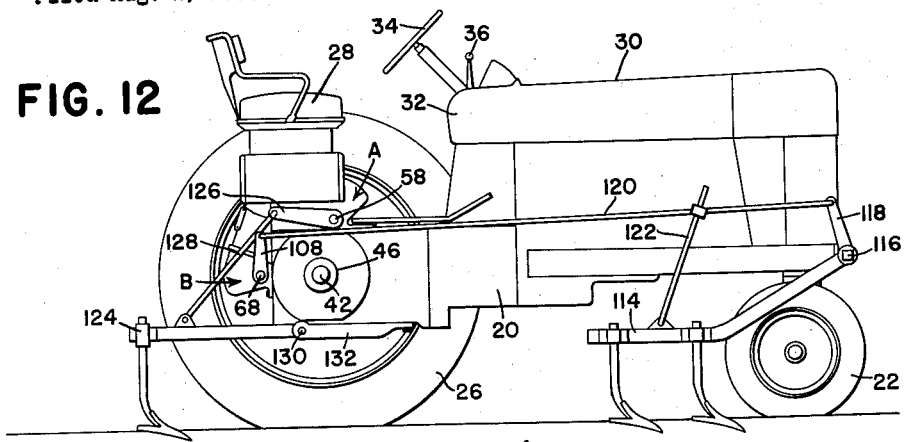
Fig. 12 is an over-all or general view, on a reduced scale, showing a typical front and rear mounted cultivator on the tractor.

The three-element linkage affords a three-point hitch for a trailing implement D (Fig. 1), such as a plow etc. The three elements of the linkage comprise right and left hand lower draft links 142 and 144 and a top link 146. The front ends of the links 142 and 144 are connected to the transverse pivot bar 130 by ball joint connections 148 and 150, respectively, and the rear ends of the links are coaxially pivotally connected to the front end of the implement D by ball joint connections 152 and 154 (Figs. 1 and 12).

In view of the universal nature of the ball joint connections at 148, 150, 152 and 154, the draft connection or linkage 140 is relatively flexible, at least to the extent that at times the draft links 142 and 144 are capable of independent vertical adjustment. For example, if the right hand link 142 is raised and lowered relative to the left hand link 144, lateral tilting of the implement D about a fore-and-aft axis generally through the connection 154 will be effected. In the case of a plow, lateral tilting is important for the purpose of leveling the plow bottoms. The manner in which this is accomplished by the present inventive control system will be elaborated below.

Fore-and-aft tilting of the implement 142 about the transverse axis at 152—154 is accomplished by rocking of the rockshaft 70, since the inner or central arm 96 thereof is connected to the top link 146 which in turn is pivotally connected at 156 to the upper end of a mast 158 integral with the implement. The forward end of the link 146 is pivotally connected at 160 to the upper end of the central arm 96 so that free articulation is afforded.

Raising and lowering of the implement bodily by simultaneously raising and lowering the draft linkage 140 is accomplished by means of the rockshaft 58 and right and left hand lift connections 162 and 164, respectively. The left hand lift connection includes a lift arm 166, rigidly affixed to the left hand end of the rockshaft 58, and a lift link 168 connected between the free end of the arm 166 and an intermediate point, as at 170, of the left hand draft link 144.

In view of the ability of the mechanism to accomplish the necessary lateral leveling or tilting by means of the right hand lift connection 162, which is adjustable, similar adjustment need not be afforded in the left hand connection 164; although, this is not to say that such adjustment could not be exploited if desired. The adjustability of the right hand connection 162 is accomplished by providing a pair of right hand arms 172 and 174, the latter of which is rigidly secured to the right hand end of the rockshaft 58 (Fig. 5) and the former of which is connected by a lift link 176 to the right hand draft link 142 by a suitable pivotal connection 178. The two arms 172 and 174 are pivotally interconnected by a pin 180 on an axis rearwardly of and parallel to the axis of the rockshaft 58. Consequently, the arm 172 is fulcrumed on and is rockable relative to the arm 174. The power-operated means for accomplishing this relative rocking utilizes the rockshaft 68 and its short crank arm 94, and for this purpose a force-transmitting connection or link 182 is connected at one end to the crank pin 102 and at its other end to the forward end of the arm 172 by a pivot pin 184 which lies on an axis normally coaxial with the rockshaft 58. A removable retainer 186 holds the pin 184 in place.

When the power unit B is hydraulically locked, it will follow that its rockshaft 68 will be stationary. In other words, the power unit B is inactive. If the power unit A is then activated, its fluid motor 56—66 will rock the rockshaft 58. In view of the inactive status of the unit B, and the substantial coaxiality between the rockshaft 58 and the pivotal connection 184, the two arms 172 and 174 will move as a unit about the rockshaft axis. In other words, the two arms may be considered integrally secured to the rockshaft 58 and these arms will rock as one, along with the left hand arm 166. Therefore, these arms will operate through their respective lift links 176 and 168 to vertically move the draft links 142 and 144 simultaneously, thereby bodily changing the vertical position of the implement D. Since the motor 56—66 in the power unit A is of the one-way type, as previously described, the implement will be raised hydraulically but will lower by its own weight.

When the implement is operating, as when plowing if it is a plow, its lateral level relative to the ground may be altered by activating the power unit B while the power unit A is inactive. Under these conditions, the rockshaft 68 will act through the crank arm 94 and link 182 to rock the adjusting arm 172 about its fulcrum 180 on the now stationary rockshaft arm 174. This will act through the right hand lift link 176 to adjust the right hand draft link 142, and consequently the right hand side of the implement, relative to the left hand draft link 144, or, in effect, tilting the implement about a fore-and-aft axis through the left hand ball joint connection 154.

Figs. 9 and 10 show a modification of the structure of Figs. 4 and 5, wherein lateral leveling of the implement by independent vertical adjustment of the right hand draft link 142 may be accomplished manually. For this purpose, the two arms 172 and 174 are interconnected by manual adjusting means 188. The link 182 and its pivot pin 184 are removed and the pivot pin is replaced by a trunnion 190 having a threaded block 192 through which a screw 194 is threaded. The lower end of the screw is journaled in an ear 196 received by a depending portion 198 of the rockshaft arm 174. The lower end of the screw is rotatably carried by the ear 196 but is held against axial displacement relative to the ear. A handle 200 is fixed to the upper end of the screw 194 and facilitates use thereof. In this case, as in the power-operated arrangement, the free end of the lever 172, at the point carrying the trunnion 190, is generally coaxial with the rockshaft 58 and the results obtainable in the power-operated arrangement are available here.

As a further adjunct to the flexibility of the arrangement, the rockshaft arm 174 is adapted to have secured thereto an auxiliary arm 202 (Fig. 4). For this purpose, the arm 174 has an upper mounting pad 204 which is vertically tapped to receive removable cap screws 206 for mounting the arm 202. The left hand arm 166 on the rockshaft 58 may be similarly constructed, thus affording two additional points for connection to implement-controlling members. For example, such auxiliary arms could be utilized for connection to push rods such as that shown at 120 in Fig. 12, and if desired, the rear rig 124, or its equivalent, could be controlled from the rockshafts 68 and 70.

In Fig. 12, it is shown that the arm 108 secured to the right hand end of the rockshaft 68 rises to a level above the axle housing 46. If desired, the arm 108 could be converted (Fig. 8) to dispose its free end below the level of the axle housing. In each case, the arms, such as those previously described, and including the crank arm 94, are mounted on the respective ends of their rockshafts by splined connections so as to enable removal and replacement in different angular positions.

Other examples of the flexibility and utility of the system have been covered above. Features and advantages not categorically enumerated will undoubtedly occur to those versed in the art, as will many modifications and alterations in the preferred embodiment of the invention illustrated, all of which may be achieved without departing from the spirit and scope thereof.

What is claimed is:

1. Implement-connecting linkage for a tractor, comprising: a pair of laterally spaced apart links having implement-receiving free ends and further having tractor-proximate ends pivotally connected to the tractor for independent vertical swinging; a first power-operated unit on the tractor, including a rockshaft spaced from the links; a pair of laterally spaced apart lift means having connections respectively to the links and further having connections respectively to the rockshaft for normally incurring simultaneous vertical swinging of the links upon rocking of the rockshaft, one of said connections being vertically adjustable independently of the other to enable independent vertical swinging of the respective link relative to said rockshaft; and a second power-operated unit on the tractor independent of the first unit and including a rockshaft and force-transmitting means connecting said second unit rockshaft to the aforesaid adjustable connection so as to act on said adjustable connection and to react on the tractor for selectively fixing and adjusting said adjustable connection respectively according to whether said second unit rockshaft is fixed or rocked.

2. Implement-connecting linkage for a tractor, comprising: first and second laterally spaced apart links having implement-receiving free ends and further having tractor-proximate ends pivotally connected to the tractor for independent vertical swinging; a first power-operated unit on the tractor, including a rockshaft spaced from the links; first lift means extending between and interconnecting the rockshaft and the first link for effecting vertical adjustment of said first link upon rocking of the rockshaft; second lift means including a first arm fixed to the rock-shaft and a second arm vertically rockable on said first arm and connected to the second link; and a second power-operated unit on the tractor independent of the first unit and including a rockshaft and force-transmitting means between said second unit rockshaft and the second arm and including a pivotal connection to the second arm for holding said second arm against rocking relative to the first arm so that rocking of the first unit rockshaft while the second unit rockshaft is stationary operates through the first and second lift means to vertically adjust the links in unison without rocking said second arm on the first arm, and said second unit rockshaft being rockable while the first unit rockshaft is stationary to act through the force-transmitting means to rock the second arm relative to the first arm and to thereby adjust the second link relative to the first link.

3. Implement-connecting linkage for a tractor, comprising: first and second laterally spaced apart links having implement-receiving free ends and further having tractor-proximate ends pivotally connected to the tractor for independent vertical swinging; a first power-operated unit on the tractor, including a rockshaft spaced from the links; first lift means extending between and interconnecting the rockshaft and the first link for effecting vertical adjustment of said first link upon rocking of the rockshaft; second lift means including a first arm fixed to the rockshaft and a second arm connected to the second link and fulcrumed on the first arm on a pivot spaced radially from the rockshaft axis, said second arm having rigid thereon a lever part projecting radially to substantial coaxiality with said rockshaft; and a second power-operated unit on the tractor independent of the first unit and including a rockshaft and force-transmitting means connecting said second unit rockshaft to the second arm lever part substantially coaxially with the first unit rockshaft for holding said second arm against rocking relative to the first arm so that rocking of the first unit rockshaft while the second unit rockshaft is stationary operates through the first and second lift means to vertically adjust the links in unison, said second unit rockshaft being rockable while the first unit rockshaft is stationary to act through the force-transmitting means to rock the second arm relative to the first arm and to thereby adjust the second link relative to the first link.

4. Implement-connecting linkage for a tractor, comprising: a pair of laterally spaced apart links having implement-receiving free ends and further having tractor-proximate ends pivotally connected to the tractor for independent vertical swinging; a first power-operated unit on the tractor, including a rockshaft spaced from the links; a pair of laterally spaced apart lift means having connections respectively to the links and further having connections respectively to the rockshaft for normally incurring simultaneous vertical swinging of the links upon rocking of the rockshaft, one of said connections being vertically adjustable independently of the others to enable independent vertical swinging of the respective link relative to said rockshaft; and a selectively activatable and inactivatable second power-operated unit on the tractor independent of the first unit and including force-transmitting means connected to the aforesaid adjustable connection so as to act on said adjustable connection and to react on the tractor for selectively fixing and adjusting said adjustable connection respectively according to whether said second unit rockshaft is inactivated or activated.

5. Implement-connecting linkage for a tractor comprising: first and second laterally spaced apart links having implement-receiving free ends and further having tractor-proximate ends pivotally connected to the tractor for independent vertical swinging; a first power-operated unit on the tractor, including a rockshaft spaced from the links; first lift means extending between and interconnecting the rockshaft and the first link for effecting vertical adjustment of said first link upon rocking of the rockshaft; second lift means including a first arm fixed to the rockshaft and a second arm vertically rockable on said first arm and connected to the second link; and a selectively activatable and inactivatable second power-operated unit on the tractor independent of the first unit and including force-transmitting means having a pivotal connection to the second arm for holding said second arm against rocking relative to the first arm and said pivotal connection being located so that rocking of the first unit rockshaft while the second unit is inactive operates through the first and second lift means to vertically adjust the links in unison without rocking said second arm on the first arm, and said second unit being activatable while the first unit rockshaft is stationary to act through the force-transmitting means and pivotal connection to rock the second arm relative to the first arm and to thereby adjust the second link relative to the first link.

6. Implement-connecting linkage for a tractor, comprising: first and second laterally spaced apart links having implement-receiving free ends and further having tractor-proximate ends pivotally connected to the tractor for independent vertical swinging; a first power-operated unit on the tractor, including a rockshaft spaced from the links; first lift means extending between and interconnecting the rockshaft and the first link for effecting vertical adjustment of said first link upon rocking of the rockshaft; second lift means including a first arm fixed to the rockshaft and a second arm connected to the second link and fulcrumed on the first arm on a pivot spaced radially from the rockshaft axis, said second arm having rigid thereon a lever part projecting radially to substantial coaxiality with said rockshaft; and a selectively activatable and inactivatable second power-operated unit on the tractor independent of the first unit and including force-transmitting means connected to the second arm lever part substantially coaxially with the first unit rockshaft for holding said second arm against rocking relative to the first arm so that rocking of the first unit rockshaft while the second unit is inactive operates through the first and second lift means to vertically adjust the links in unison, said second unit being activatable while the first unit rockshaft is stationary to act through the force-transmitting means to rock the second arm relative to the first arm and to thereby adjust the second link relative to the first link.

7. Implement-connecting linkage for a tractor, comprising: a pair of spaced apart links having implement-receiving free ends and further having tractor-proximate ends pivotally connected to the tractor for independent vertical swinging; a first power-operated unit on the tractor, including a rockshaft spaced from the links; a pair of lift arms fixed to the rockshaft in axially spaced apart relation; a pair of lift connections respectively interconnecting the arms to the links for incurring simultaneously vertical swinging of the links upon rocking of the rockshaft, one of said lift connections being vertically adjustable relative to its lift arm for affording independent vertical swinging of the respective link; and a second power-operated unit independent of the first unit and connected to said adjustable lift connection, said second unit acting on said adjustable lift connection and reacting directly on the tractor and being selectively activatable to adjust said one lift connection while the first unit rockshaft is stationary and deactivatable to hold said one lift connection against adjustment while the first unit rockshaft is rocked.

8. Implement-connecting linkage for a tractor, comprising: a pair of laterally spaced apart links having implement-receiving free ends and further having tractor-proximate ends pivotally connected to the tractor for independent vertical swinging; a first power-operated unit on the tractor, including a pair of laterally spaced apart lift means connected respectively to the links for normally incurring simultaneous vertical swinging of the links upon activation of said unit, one of said lift means being adjustable independently of the others to enable independent vertical swinging of the respective link; and a second selectively activatable and deactivatable power unit on the tractor independent of the first unit and connected to said adjustable lift means to act on said adjustable lift means and to react directly on the tractor for selectively fixing and adjusting said adjustable lift means respectively according to whether said second unit is deactivated or activated.

9. In a tractor and implement train in which the implement has a pair of laterally spaced hitch points and a third hitch point centrally between and spaced vertically from said pair of hitch points: draft linkage comprising a pair of laterally spaced apart trailing draft links pivotally connected on a transverse axis at their rear ends respectively to said pair of hitch points and independently pivotally connected at their front ends on a transverse axis to the tractor; a first power unit on the tractor including a transverse rockshaft having a pair of lift arms fixed thereto; a pair of lift connections respectively connecting the arms to the links for normally raising the links in unison to lift the implement upon rocking of said rockshaft; one of said lift connections being vertically adjustable relative to the rockshaft to enable independent vertical adjustment of the respective link to adjust the implement laterally generally about a fore-and-aft axis; a second power unit on the tractor including a rockshaft having force-transmitting means connected to the adjustable lift connection for selectively fixing and adjusting said connection according to whether said second unit rockshaft is stationary or rocked; a third power unit on the tractor including a transverse rockshaft having an arm secured thereto for movement therewith; a center link pivotally connected at its forward end to said third unit rockshaft arm on a transverse axis and pivotally connected at its rear end on a transverse axis to the aforesaid third hitch point on the implement for effecting fore-and-aft tilting of the implement about the axis of the connection between said pair of links and said pair of hitch points; and first, second and third control means on the tractor and operatively connected respectively to the first, second and third power units for respectively obtaining lifting of the implement via the first unit rockshaft, lateral adjustment of the implement via the second unit rockshaft, and fore-and-aft tilting of the implement via the third unit rockshaft.

10. In a tractor and trailing implement in which the implement is articulately connected to the tractor for bodily lifting movement, for lateral tilting about a fore-and-aft axis and for fore-and-aft tilting about a transverse axis, the improvement comprising: first, second and third independently operative power units on the tractor and respectively including first, second and third rockshafts; lift means connected between the first rockshaft and the implement for lifting the implement upon rocking of the first rockshaft; lateral tilt means connected between the second rockshaft and the implement for laterally tilting the implement via rocking of the second rockshaft; fore-and-aft tilt means connected between the third rockshaft and the implement for tilting the implement fore-and-aft via rocking of said third rockshaft; and first, second and third control means operatively connected respectively to and for independently controlling said first, second and third units.

11. For a tractor having an implement connected thereto by draft linkage including a pair of laterally spaced lower links and a top link enabling bodily vertical movement of the implement, fore-and-aft tilting of the implement about a transverse axis and lateral tilting of the implement about a fore-and-aft axis: power operated mechanism on the tractor comprising first, second and third independently operative power units respectively having first, second and third transverse rockshafts; a pair of lift means spaced laterally apart on the first rockshaft and connected respectively to the lower links, one of said lift means being vertically adjustable relative to said first rockshaft; lateral tilt means on the second rockshaft and connected to one lower link via the adjustable lift means; fore-and-aft tilt means connected between the third rockshaft and the top link; first control means on the tractor and connected to the first power unit for rocking the first rockshaft, while the second and third rockshafts are inactive, for bodily lifting the implement; second control means on the tractor and connected to the second power unit for rocking the second rockshaft, while the first and third rockshafts are inactive, for laterally adjusting the implement via said adjustable lift means; and third control means on the tractor and connected to the third unit for rocking the third rockshaft, while the first and second rockshafts are inactive, to tilt the implement fore-and-aft via the third rockshaft.

12. In a tractor having a fore-and-aft body and axle means projecting laterally outwardly respectively from opposite sides of the body: power control mechanism comprising a first power unit having a casing secured to the body above the level of the axle means, a transverse rockshaft carried by and projecting at opposite ends respectively at opposite sides of said casing, and rockshaft arms connected respectively at said opposite rockshaft ends; a second power unit including a casing secured to the body rearwardly of the axle means and at one side of the fore-and-aft median plane of the body, a transverse rockshaft carried by the second unit casing at substantially the level of the axle means and having an inner end projecting laterally substantially to said median plane and an opposite outer end projecting laterally at one side of the body and inner and outer arms secured respectively to the inner and outer ends of said second unit rockshaft; and a third power unit including a casing secured to the tractor body alongside of and in laterally spaced relationship to the second unit casing at the opposite side of the median plane, said spaced relationship accommodating said inner arm, a rockshaft carried by the third unit casing coaxially with the second unit rockshaft and having an outer end projecting laterally at the opposite side of the body, and an outer arm secured to the outer end of said third unit rockshaft.

13. The invention defined in claim 12, in which: the outer arms are selectively mountable on the respective outer ends of said second and third unit rockshafts in upper positions projecting above the level of the axle means or in lower positions projecting below the level of the axle means.

14. In a tractor having a fore-and-aft body and axle means projecting laterally outwardly respectively from opposite sides of the body: power control mechanism comprising a first power unit having a casing secured to the body above the level of the axle means, a transverse rockshaft carried by and projecting at opposite ends respectively at opposite sides of said casing, and rockshaft arms connected respectively at said opposite rockshaft ends; a second power unit including a casing secured to the body rearwardly of the axle means and at one side of the fore-and-aft median plane of the body, a transverse rockshaft carried by the second unit casing at substantially the level of the axle means and having an outer end projecting laterally at one side of the body and an outer arm secured to the outer end of said second unit rockshaft; and a third power unit including a casing secured to the tractor body alongside the second unit casing at the opposite side of the median plane, a rockshaft carried by the third unit casing coaxial with the second unit rockshaft and having an outer end projecting laterally at the opposite side of the body, and an outer arm secured to the outer end of said third unit rockshaft.

15. The invention defined in claim 14, in which: the outer arms are selectively mountable on the respective outer ends of said second and third unit rockshafts in upper positions projecting above the level of the axle means or lower positions projecting below the level of the axle means.

16. For a tractor having an implement connected thereto by draft linkage including a plurality of articulately related links enabling bodily vertical movement of the implement, fore-and-aft tilting of the implement about a transverse axis and lateral tilting of the implement about a fore-and-aft axis: power operated mechanism on the tractor comprising first, second and third independently operative power units respectively having first, second and third transverse rockshafts; a pair of lift means spaced laterally apart on the first rockshaft and connected respectively to a pair of the links, one of said lift means being vertically adjustable relative to said first rockshaft; lateral tilt means on the second rockshaft and connected to one of the links of said pair via the adjustable lift means; fore-and-aft tilt means connected between the third rockshaft and a link other than said pair of links; first control means on the tractor and connected to the first power unit for rocking the first rockshaft, while the second and third rockshafts are inactive, for bodily lifting the implement; second control means on the tractor and connected to the second power unit for rocking the second rockshaft, while the first and third rockshafts are inactive, for laterally adjusting the implement via said adjustable lift means; and third control means on the tractor and connected to the third unit for rocking the third rockshaft, while the first and second rockshafts are inactive, to tilt the implement fore-and-aft via the third rockshaft.

17. Implement-connecting linkage for a tractor, comprising: first and second laterally spaced apart links having implement-receiving free ends and further having tractor-proximate ends pivotally connected to the tractor for independent vertical swinging; a power-operated unit on the tractor, including a rockshaft spaced from the links; first lift means extending between and interconnecting the rockshaft and the first link for effecting vertical adjustment of said first link upon rocking of the rockshaft; second lift means including a first arm fixed to the rockshaft and a second arm vertically rockable on said first arm and connected to the second link, said second arm having a lever portion projecting into substantial coaxiality with the rockshaft; and means connected to said lever portion and reacting directly on the tractor and operative selectively to fix or adjust the second arm relative to the first arm for respectively incurring simultaneous adjustment of both links, when said second arm is thus fixed, or independent adjustment of the second link when said second arm is adjusted.

References Cited in the file of this patent

UNITED STATES PATENTS

| 2,334,862 | Brown | Nov. 23, 1943 |
| 2,368,125 | Evans | Jan. 30, 1945 |
| 2,416,373 | Brown | Feb. 25, 1947 |
| 2,678,508 | Reuter et al. | May 18, 1954 |
| 2,678,596 | Todd | May 18, 1954 |
| 2,680,401 | Heller et al. | June 8, 1954 |
| 2,711,633 | Ford | June 28, 1955 |
| 2,713,298 | Lindeman et al. | July 19, 1955 |
| 2,734,438 | Todd | Feb. 14, 1956 |
| 2,766,536 | Perkins | Oct. 16, 1956 |
| 2,804,034 | Hunter | Aug. 27, 1957 |

FOREIGN PATENTS

| 738,881 | Great Britain | Oct. 19, 1955 |